United States Patent
Cardellach Lopez et al.

(10) Patent No.: US 7,076,160 B2
(45) Date of Patent: Jul. 11, 2006

(54) DISPENSING INDICATOR FOR AN ACTIVE SUBSTANCE DISPENSER

(75) Inventors: Jaume Cardellach Lopez, Barcelona (ES); Andrea Caserta, Barcelona (ES); Cedric Morhain, Barcelona (ES)

(73) Assignee: DBK Espana, S.A. (ES)

( * ) Notice: Subject to any disclaimer, the term of this patent is extended or adjusted under 35 U.S.C. 154(b) by 0 days.

(21) Appl. No.: 10/482,814

(22) PCT Filed: Jul. 4, 2001

(86) PCT No.: PCT/ES01/00264

§ 371 (c)(1),
(2), (4) Date: Jun. 8, 2004

(87) PCT Pub. No.: WO03/014682

PCT Pub. Date: Feb. 20, 2003

(65) Prior Publication Data

US 2005/0008350 A1    Jan. 13, 2005

(51) Int. Cl.
*F24F 6/00* (2006.01)
(52) U.S. Cl. .................. 392/392; 392/390; 374/161
(58) Field of Classification Search ........... 392/386, 392/387, 390, 391, 392, 393, 394, 395; 239/34, 239/35, 36; 428/1.1, 320.2; 349/11, 12, 349/20; 374/161, 162
See application file for complete search history.

(56) References Cited

U.S. PATENT DOCUMENTS

| | | | | |
|---|---|---|---|---|
| 2,308,087 A | * | 1/1943 | Lappala | 116/216 |
| 4,032,687 A | * | 6/1977 | Hornsby, Jr. | 428/1.61 |
| 4,105,583 A | * | 8/1978 | Glover et al. | 436/7 |
| 4,156,365 A | * | 5/1979 | Heinmets et al. | 374/162 |
| 4,220,680 A | * | 9/1980 | Corsi | 374/162 |
| 4,228,761 A | | 10/1980 | Glover et al. | |
| 4,725,712 A | * | 2/1988 | Schroeder | 392/392 |
| 4,804,821 A | * | 2/1989 | Glucksman | 392/390 |
| 4,933,525 A | * | 6/1990 | St. Phillips | 219/725 |
| 5,175,791 A | | 12/1992 | Muderlak et al. | |
| 5,558,700 A | * | 9/1996 | Shibahashi et al. | 106/31.15 |
| 6,228,804 B1 | * | 5/2001 | Nakashima | 503/226 |

FOREIGN PATENT DOCUMENTS

| | | |
|---|---|---|
| EP | 0837011 | 4/1998 |
| GB | 2092744 | 8/1982 |
| GB | 2310283 | 8/1997 |
| GB | 2312955 | 11/1997 |
| GB | 2348703 | 10/2000 |
| GB | 2351550 | 1/2001 |

* cited by examiner

*Primary Examiner*—Sang Paik
(74) *Attorney, Agent, or Firm*—Ostrolenk, Faber, Gerb & Soffen, LLP

(57) ABSTRACT

The indicator is a non-electric indicator and is based on a thermochromic material which is applied on a diffuser or thermodiffuser device of volatile substances (1), so that when heating of the latter takes place to evaporate the volatile substance contained in a reservoir associated with said device (1), when a determined temperature is reached the indicator, constituted by a plastic insert (4) with thermochromic pigments, changes colour and indicates that the diffuser device (1) is in diffusion conditions. The colour change product can be constituted by the combination of some thermochromic and normal paints applied on the external surface of the device, so that when a determined temperature is reached the thermochromic paint changes colour and originates an indication of the device being in diffusion conditions.

15 Claims, 1 Drawing Sheet

DISPENSING INDICATOR FOR AN ACTIVE SUBSTANCE DISPENSER

OBJECT OF THE INVENTION

The present invention relates to an indicator of diffusion applicable to the diffuser devices or evaporators of active substances, by release of heat, which are used for example as air fresheners or diffusers of insecticides, without restriction whatsoever on the type of active substance diffused.

The object of the invention is to provide a non-electric indicator of diffusion from an active substance diffuser device, being based on the use of a thermochromic product which changes colour when reaching and/or exceeding a determined temperature and recovers the original colour again when the temperature is below the normal operating temperature of the diffuser device.

By means of this indicator, it is possible to know whether-an active substance diffuser device by release of heat is or is not in operation without requiring any electric component whatever, since the heating/cooling of the actual diffuser is that which determines the change of colour of the indicator and therefore the signalling of operation/non-operation of said diffuser device.

BACKGROUND OF THE INVENTION

Determined diffuser devices of active substances, used as air fresheners, insecticides and the like, are based on the heating of the active substance contained in the actual diffuser device, so that the evaporation of said substance permeates the surroundings in which the device in question is located.

This type of device can come with a plug forming an integral part thereof so that in this particular case it is applied directly in an electric plug socket. In general, heat is released by means of an exothermic process based on a heater element included in the diffuser device. With this the heating takes place of the volatile substance contained in the diffuser device, which gives rise to the evaporation of said substance. For this reason, it is convenient to refer in a general manner to that kind of active substance diffuser device as "thermodiffuser".

Such active substance thermodiffusers are marketed in some cases with no indicator whatever as to whether they are releasing heat or not, whereby it is not known whether the device is fulfilling its diffusion function or not, unless it is touched and it is observed by touch whether or not it is hot, assuming that if it is hot the device is diffusing and if it is cold the device is not diffusing.

In the particular case in which these active substance thermodiffusers have a plug for the supply of electric power to a heater, they can moreover be marketed with a luminous indicator, generally a light-emitting diode (hereinafter a LED), so that if said LED is on, it indicates that the thermodiffuser is being fed electrically, but not with certainty that the heating being produced is characteristic of its correct operation.

There is a third type of active substance thermodiffuser whose operation is determined either by the position of an electric switch which can be light-emitting or not, or by the relative position of one or more than one moving piece which forms part of the design of the device and acts as an electric switch.

In all cases, and specifically in those in which there is a light-emitting indicator or indicator of another type to signal the supply of power, it is known if the device is being fed electrically, but it is not known if evaporation of the active substance is taking place by means of heating.

On the other hand, thermochromic elements are known applicable as informative means or as indicators of the temperature of certain devices. In this sense mention can be made of the European Patent with Publication Number 0294136, in which a heating unit is described with thermochromic indicator of the temperature, wherein the indicator includes an electrically resistant thick film indicator track, with a defined configuration printed on a substrate of a layer of thermochromic material applied to the substrate to cover and surround the defined configuration. For its part, the heating unit includes elements to respond to the current flowing through the heating element, generating a current in the indicator track. Consequently, when the element heats up, so too the indicator track, an area of colour change being visible which shows the defined configuration.

Likewise, mention can be made of the European Patent with Publication Number 0287336 with respect to one a heating unit with thermochromic region which comprises a warmable surface with a region of that surface coated or provided with a layer which has a thermochromic material in sufficient quantity to be affected by the received heat, the thermochromic material having a limiting wavelength of absorption which changes reversibly with temperature in the range from 20 to 400° C., at least. The absorption wavelength limit is at least 540 nm at 20° C. and increases progressively up to 700 nm at 400° C. This heating unit can provide a visible indication of whether the warmable surface is or is not yet hot when the electric power has been disconnected.

Likewise, mention can be made of the Spanish Patent with Publication Number 2147513, with respect to a temperature indicator system which comprises a support which is printed with one or more thermochromic inks and which is coupled to a temperature indicator scale, which is calibrated according to the characteristic temperature of the inks mentioned. The system is based on printing the aforementioned support with a band of ink, thermochromic or not thermochromic, on which are printed in turn windows of whatever form, placed successively with a thermochromic ink of characteristic temperature different to that of the band. This indicator system is applicable in the production of devices which can be adapted to containers of products the temperature of which should be controlled in a continuous manner.

Mention could also be made of the Spanish Patent with Publication Number 2137129 with respect to a procedure to obtain the chromatic variation of objects, in the presence of external stimuli and product obtained thereby.

In any case, no non-electric indicators of operation of an active substance thermodiffuser device are known, based on the thermochromic property of certain products.

DESCRIPTION OF THE INVENTION

The indicator that is proposed, constitutes a thermoindicator of non-electric operation of an active substance diffuser device which changes colour when the device has reached the operating temperature at which evaporation takes place of the volatile active substance, whilst the mentioned indicator recovers its original colour at the moment when the temperature falls below the aforementioned colour change value.

The indicator is defined by an element which contains or is coated with thermochromic pigments or materials, so that with the thermodiffuser on, when the latter reaches a certain temperature due to the heat emitted by the heater, a colour change of the indicator takes place. In the case where the thermodiffuser belongs to the category of devices which are connected to the electricity mains, there will be a delay in colour change of the indicator with respect to the connection to the electricity mains, whilst when the device is turned off and the corresponding cooling takes place, the indicator returns to its initial colour when it reaches a temperature below the colour change temperature with the recognised delay with respect to the disconnection of the electricity mains.

The high temperature colour corresponds to the diffusion temperature conditions of the active substance.

The non-electric indicator of operation of an active substance diffuser device, according to the foregoing, offers a series of benefits among which mention can be made of the following:

It constitutes a diffusion indicator with residual effect and unconnected with the power supply of the device.

It provides thermal safety since it warns of the device being in the hot state.

It signifies an economic benefit, since the production cost of the device will be less than if this had an electric indicator constituted by a LED.

It signifies an aesthetic advantage of the assembled device, allowing greater design freedom than when the device includes a LED indicator, since it can be constituted with different colours, with different patterns, offering written messages, etc.

As for the colour change temperature, it will be programmable and designable in the range 0° C. to 90° C., to adapt to the temperature of the casings of this type of active substance diffuser devices, all this as a function of the temperature of the internal heater, the geometry of the piece, the type of plastic employed, etc.

Also, and in connection with the colours of the indicator, the corresponding thermochromic pigment when losing its colour above a certain temperature admits two possibilities, one that the colour change gives rise to transparency or that the change gives rise to another different colour.

It is evident that the forms of embodiment of the indicator are multiple, the location thereof being conditioned by the temperature, the visibility of the area, aesthetic criteria, etc.

More specifically, the indicator can be constituted by an insert the material of which can have thermochromic properties overall or in part, the insert being formed by a piece of plastic with thermochromic properties, as part of the casing of the diffuser device, it being possible to incorporate the pigment in the plastic by means of extrusion, it being possible to obtain the insert by means of injection moulding.

Also, the insert mentioned can have a part with a higher thermal conductivity in proximity to the heater element, to facilitate the conduction of heat produced by the latter to the surface of the device providing a greater sensitivity to the heating of the latter.

The surface of the insert, when heated above a certain temperature, passes from one colour to other demonstrating the device is in operation.

In another form of embodiment, the indicator can be constituted by the application of a thermochromic paint blended or not with a non-thermochromic paint on the surface of the diffuser device, the impression being made by means of tampography preferably with a prior stage of surface treatment of the substrate to improve the adhesion of the coating.

The thermochromic paint and the normal paint, at low temperature, are indistinguishable in their colour, whilst above a certain temperature, the thermochromic pigment loses its colour and the area corresponding thereto appears visible. This can be a message, for example "ON", that the heater of the thermodiffuser has reached a temperature compatible with the release of active substance, so that when falling below 45° C. (for example), the thermochromic pigment recovers its colour, and the message disappears.

Finally, mention is made that the product, when it is thermochromic paint and normal paint, can be applied on a plasticised label, which is attached by sticking to the surface of the device, based on an adhesive resistant to solvents and temperature, with a prior stage of surface treatment of the casing of the device to improve the adhesion of the label.

Consequently, and due to the diverse technologies in which it is possible to apply the indicator on an active substance diffuser device, since it can be implemented by impregnation, painting, stamping, etc., it provides versatility in design and obvious advantages of appearance, since any geometric configuration can be given to the indicator, either defining a message with the change of colour, or forming any figure whatsoever, star, bar, ring, disk, etc.

DESCRIPTION OF THE DRAWINGS

To complete the description that is being made and with the object of assisting in a better understanding of the characteristics of the invention, in accordance with a preferred example of practical embodiment thereof, this description is accompanied, as an integral part thereof, with a set of drawings wherein, by way of illustration and not restrictively, the following has been represented.

PREFERRED EMBODIMENT OF THE INVENTION

Figure 1:
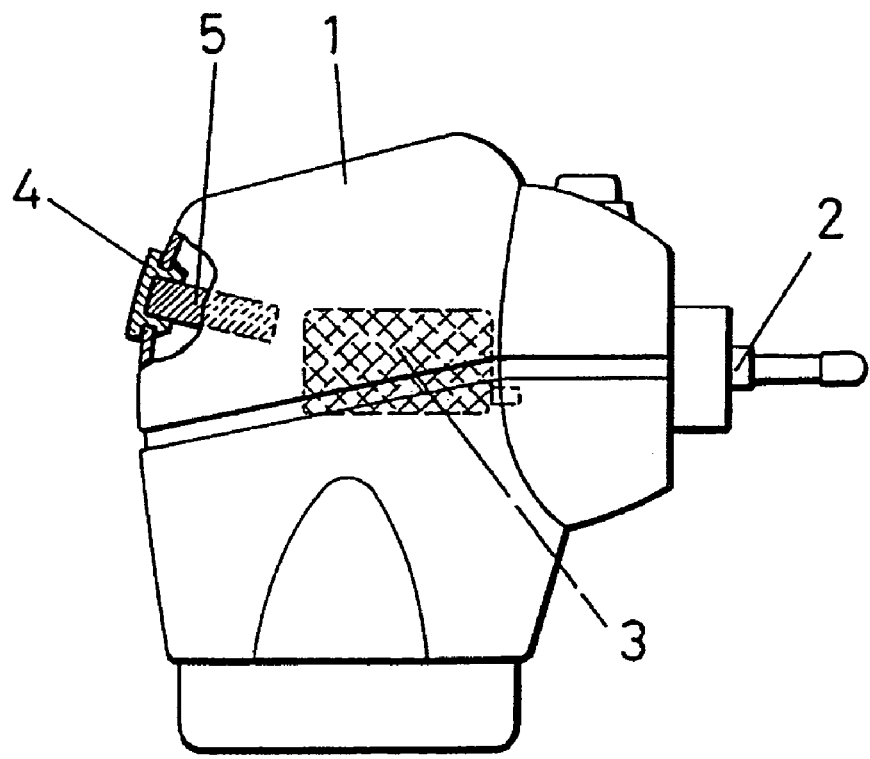
FIG. 1 shows a general view of an active substance diffuser device with a non-electric indicator of operation constituted by an insert.

In the light of the figures mentioned, and especially of FIG. 1, an active substance diffuser device (1) can be seen, with a conventional configuration and fitted with the corresponding plug (2) to be connected to an electric power socket and to bring about the electrical operation of the device, which will involve the heating of a heater housed in the interior, by means of which heater it is heated and the evaporation is produced of a volatile substance of those employed as air freshener, insecticide, etc., and which will be located in a container adaptable to the body of the thermodiffuser (1). The heater element referred to above is that with reference number (3).

In this form of embodiment represented in FIG. 1, the non-electric indicator of operation is constituted by a thermochromic insert (4) with an area which is in correspondence with the external surface of the device (1), insert (4) which has one part (5) of higher thermal conductivity and which conducts the heat of the heater element (3) to the surface of the device (1), providing a greater sensitivity to the heating of the latter, so that through said part (5) the surface of the insert will reach the determined temperature at which it must change colour, said temperature corresponding to that of the device beginning operation or, in other words, the beginning of evaporation of the active substance.

The insert (4) is constituted by a plastic material with the appropriate thermochromic properties, being associated with the device (1) as an integral part thereof, with the particularity that the pigment which provides the thermochromic property to the insert (4) can be incorporated by means of extrusion, or be obtained overall by means of injection moulding.

Consequently, when the insert (4) is warmed above a certain temperature, said insert passes from one colour to another demonstrating the device (1) is in operation.

Figure 2:
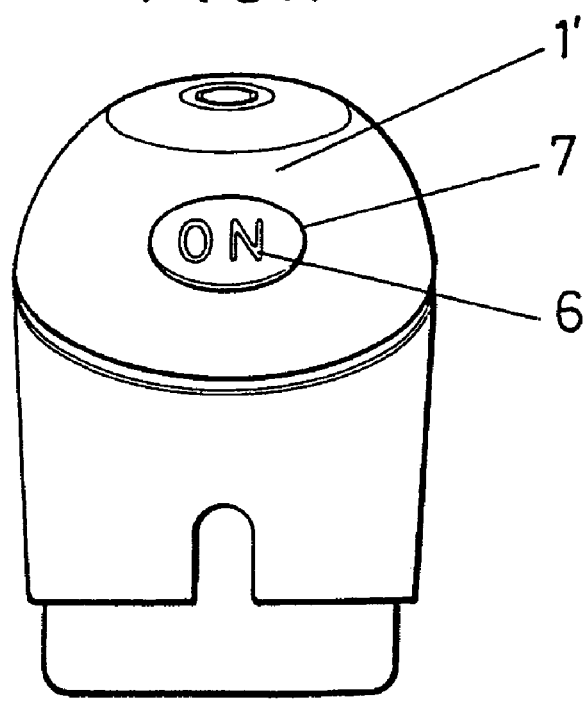
FIG. 2 shows another general view of an active substance diffuser device, in which the non-electric indicator of operation is constituted by a thermochromic paint and a normal paint.

In a variant of embodiment, the indicator applicable to the active substance diffuser device (1'), as is represented in FIG. 2, is determined by a thermochromic paint (6) and a normal or non-thermochromic paint (7), both conveniently applied on the external surface of the device (1'), or on a label appropriately placed in the same location, either by means of printing by tampography or by any other system, so that those two paints (6) and (7) are not distinguishable insofar as their colour is concerned when they are at low temperature, whilst when they reach a determined temperature the corresponding thermochromic pigment loses its colour and a sign appears, which can be a word, a message, etc., so that in the representation of FIG. 2 that message corresponds to the word "ON" which indicates that the device is releasing heat and with it the active substance is diffused. When the temperature falls below a determined value, the thermochromic pigment recovers its colour and the message corresponding to the paint (6) vanishes.

As has already been said in the course of the present description, the paints (6) and (7) can be applied equally on a label which is attached by any conventional system to the surface of the device, by means of an adhesive resistant to solvents and temperature and when necessary, a pre-treatment of the surface of the plastic provided to receive the printing by tampography or the label.

The invention claimed is:

1. An active substance diffuser which comprises a diffusion indicator, wherein said diffuser operates by heating an active substance contained in the diffuser, and wherein the diffuser includes a plug for connection to an electricity mains supply, which is connected with a heater element to heat the active substance and cause its corresponding evaporation, said diffusion indicator comprising a thermochromic element mountedon a visible part of a body portion of the diffuser, wherein the thermochromic element comprises a plastic insert provided with one or more pigments, wherein at least one said pigment has thermochromic properties and wherein the insert comprises a portion having a relatively higher thermal conductivity than a remaining portion of the insert, mounted next to the heater element of the diffuser device, and adapted for transmitting heat to an external portion of the insert.

2. The active substance diffuser according to claim 1, wherein the insert forms an integral part of the diffuser device having a function in the diffuser besides that conferred by its thermochromic properties.

3. The active substance diffuser according to claim 2, wherein the element comprises a thermochromic paint blended or not with a non-thermochromic paint, located on the external surface of the diffuser, wherein the color of both said paints is the same at low temperature, and wherein heating the diffuser to a predetermined elevated temperature causes thermochromic pigment in the paint to lose its color, thus allowing a message or indication of operation of the diffuser device to appear.

4. The active substance diffuser according to claim 2, wherein the paints are applied by printing, and wherein said printing is performed by a method selected from the group consisting of tampography, serigraphy, flexography, photolithography, thermotransfer, and lithography on the external surface of the diffuser device.

5. The active substance diffuser according to claim 4, wherein a fixing agent is applied to fix said paints by drying or chemical reticulation.

6. The active substance diffuser according to claim 1, wherein the insert does not form an integral part of the diffuser, wherein the insert has no functional role in the diffuser apart from that which its thermochromic properties confer upon it, and wherein the insert plays no role in the release of the active substance by the diffuser.

7. The active substance diffuser according to claim 1, wherein the pigment having thermochromic properties is incorporated in the plastic insert by extrusion.

8. The active substance diffuser according to claim 1, wherein the insert is obtained by molding.

9. The active substance diffuser according to claim 1, wherein the insert is obtained by extrusion.

10. The active substance diffuser according to claim 1, wherein the insert is obtained by thermoforming molding.

11. The active substance diffuser according to claim 1, wherein the diffusion indicator comprises a thermochromic paint, blended or not with a non-thermochromic paint, located on the external surface of the diffuser, wherein the color of said paints is the same at low temperature, while heating the diffuser to a predetermined higher temperature causes thermochromic pigment in the paint to lose its color, thus allowing a message or indication of operation of the diffuser to appear.

12. The active substance diffuser according to claim 11, wherein the paints are applied by printing, and wherein said printing is performed by a method selected from the group consisting of tampography, serigraphy, flexography, photolithography, thermotransfer, and lithography on the external surface of the diffuser device.

13. The active substance diffuser according to claim 12, wherein the paints are located on a label fixed by an adhesive to the external surface of the diffuser.

14. The active substance diffuser according to claim 12, wherein a fixing agent is applied to fix said paints by drying or chemical reticulation.

15. The active substance diffuser according to claim 11, wherein the paints are located on a label fixed by an adhesive to the external surface of the diffuser.

* * * * *